(12) United States Patent
McKinley et al.

(10) Patent No.: US 8,294,761 B2
(45) Date of Patent: Oct. 23, 2012

(54) APPARATUS FOR INSPECTING A VEHICLE BRAKE COMPONENT AND METHOD FOR PERFORMING SUCH INSPECTION

(75) Inventors: Jody A. McKinley, Mt. Vernon, OH (US); Robert Zepfel, Westerville, OH (US)

(73) Assignee: Kelsey-Hayes Company, Livonia, MI (US)

( * ) Notice: Subject to any disclaimer, the term of this patent is extended or adjusted under 35 U.S.C. 154(b) by 1505 days.

(21) Appl. No.: 11/648,705

(22) Filed: Dec. 29, 2006

(65) Prior Publication Data

US 2008/0158353 A1    Jul. 3, 2008

(51) Int. Cl.
*H04N 7/18* (2006.01)

(52) U.S. Cl. ............ 348/128; 348/64; 348/65; 348/68; 348/82; 348/83; 348/84; 348/85; 348/86; 348/125; 348/126; 348/127

(58) Field of Classification Search ............. 348/64–65, 348/68, 82–86, 125–128
See application file for complete search history.

(56) References Cited

U.S. PATENT DOCUMENTS

| | | | | |
|---|---|---|---|---|
| 4,989,586 A * | 2/1991 | Furukawa | ...................... | 600/110 |
| 5,311,639 A * | 5/1994 | Boshier | ............................ | 15/324 |
| 5,392,122 A * | 2/1995 | Ulanov et al. | ................ | 356/626 |
| 5,568,965 A * | 10/1996 | Eagan | ........................... | 362/135 |
| 5,644,394 A * | 7/1997 | Owens | ....................... | 356/241.5 |
| 6,091,453 A * | 7/2000 | Coan et al. | .................... | 348/373 |
| 7,136,098 B1 * | 11/2006 | Burnett et al. | ............. | 348/230.1 |
| 7,322,447 B2 * | 1/2008 | Deckhut et al. | .......... | 188/1.11 L |
| 7,584,534 B2 * | 9/2009 | Pease et al. | ..................... | 29/729 |
| 2001/0048550 A1 | 12/2001 | Kajiro | | |
| 2005/0075539 A1 * | 4/2005 | Schulz et al. | ................. | 600/160 |
| 2006/0258265 A1 * | 11/2006 | Moeller et al. | .................... | 451/6 |
| 2007/0070340 A1 * | 3/2007 | Karpen | ....................... | 356/241.1 |
| 2008/0247061 A1 * | 10/2008 | Simkulet et al. | .............. | 359/730 |

FOREIGN PATENT DOCUMENTS

| | | |
|---|---|---|
| CN | 1605319 A | 4/2005 |
| DE | 20020055 U1 | 5/2001 |

OTHER PUBLICATIONS

Office Action from the Patent Office of the People's Republic of China, Application No. 200610142581.8 dated Feb. 12, 2010, Applicant: Kelsey-Hayes Company. English-Unofficial Translation of Selected Portions of Office Action Provided.

* cited by examiner

*Primary Examiner* — Duyen Doan

(74) *Attorney, Agent, or Firm* — MacMillan, Sobanski & Todd, LLC

(57) ABSTRACT

An apparatus for the inspection a vehicle component to detect the presence of a part defect and a method for performing the inspection. According to one embodiment, the apparatus for inspecting the vehicle component comprises: a camera having a lens; a borescope having a first end and a second end, the first end operatively disposed adjacent the camera and the second end having a mirror disposed therein; and a light source for supplying light to the borescope whereby the mirror is operative to reflect an image of an area of the vehicle component to be inspected to the camera.

20 Claims, 9 Drawing Sheets

US 8,294,761 B2

APPARATUS FOR INSPECTING A VEHICLE BRAKE COMPONENT AND METHOD FOR PERFORMING SUCH INSPECTION

BACKGROUND OF THE INVENTION

This invention relates in general to the inspection of a vehicle component and in particular to an apparatus for the inspection of a vehicle brake component and a method for performing the inspection of such a vehicle brake component.

SUMMARY OF THE INVENTION

This invention relates to an apparatus for the inspection a vehicle brake component to detect the presence of a part defect and a method for performing the inspection.

According to one embodiment, the apparatus for inspecting a vehicle component comprises: a camera having a lens; a borescope having a first end and a second end, the first end operatively disposed adjacent the camera and the second end having a minor disposed therein; and a light source for supplying light to the borescope whereby the mirror is operative to reflect an image of an area of the vehicle component to be inspected to the camera.

According to another embodiment, the apparatus for inspecting a brake component to detect the presence of a part defect comprises: a camera having a lens attached thereto; a borescope having a first end and a second end, the first end operatively disposed adjacent the lens of the camera and the second end having a mirror disposed therein adjacent an area of the brake component to thereby detect the presence of a part defect; and a light source for supplying light to the borescope whereby the mirror is operative to reflect an image of the area of the brake component to be inspected to the camera.

According to yet another embodiment, the method for inspection of a vehicle component to detect the presence of a part defect comprises the steps of: (a) providing a vehicle component having an area to be inspected; (b) providing a vision system including a camera having a lens, a borescope having a first end and a second end, the first end operatively disposed adjacent the camera and the second end having a mirror disposed therein, and a light source for supplying light to the borescope whereby the minor is operative to reflect an image of the area of the vehicle component to be inspected to the camera; (c) introducing a borescope into the workpiece; (d) actuating the light source; (e) operating a camera to capture the image of the area of the vehicle component; and (f) using the captured image to detect the presence of a part defect in the vehicle component.

According to yet another embodiment, the method and apparatus includes a cleaning fixture which is operative to remove foreign objects from the area of the vehicle component to be inspected prior to inspection of such area by the vision system.

Other advantages of this invention will become apparent to those skilled in the art from the following detailed description of the preferred embodiments, when read in light of the accompanying drawings.

DETAILED DESCRIPTION OF THE INVENTION

Figure 1:
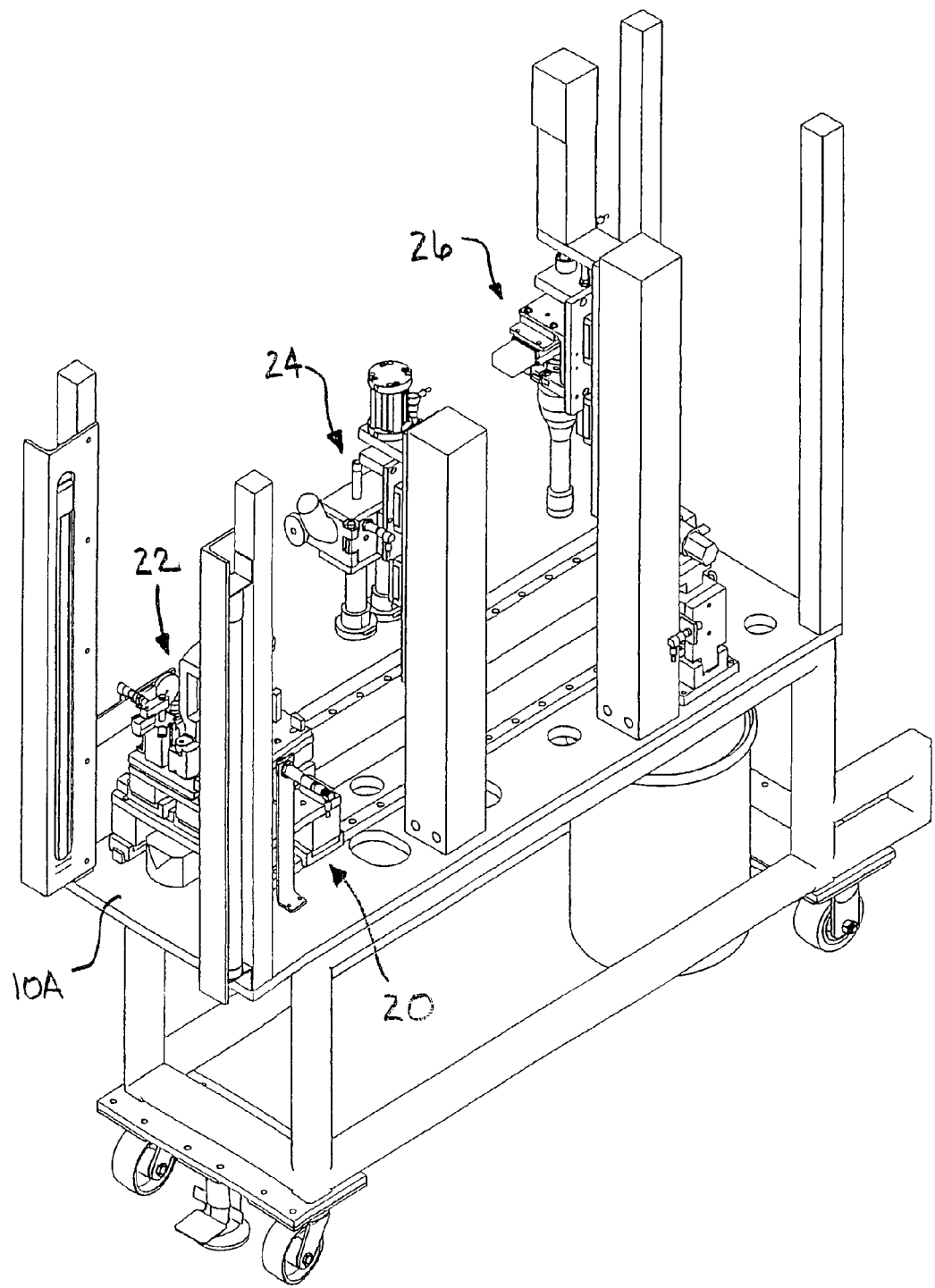
FIG. 1 is a perspective view of an embodiment of a vehicle brake inspection apparatus.
Figure 2:
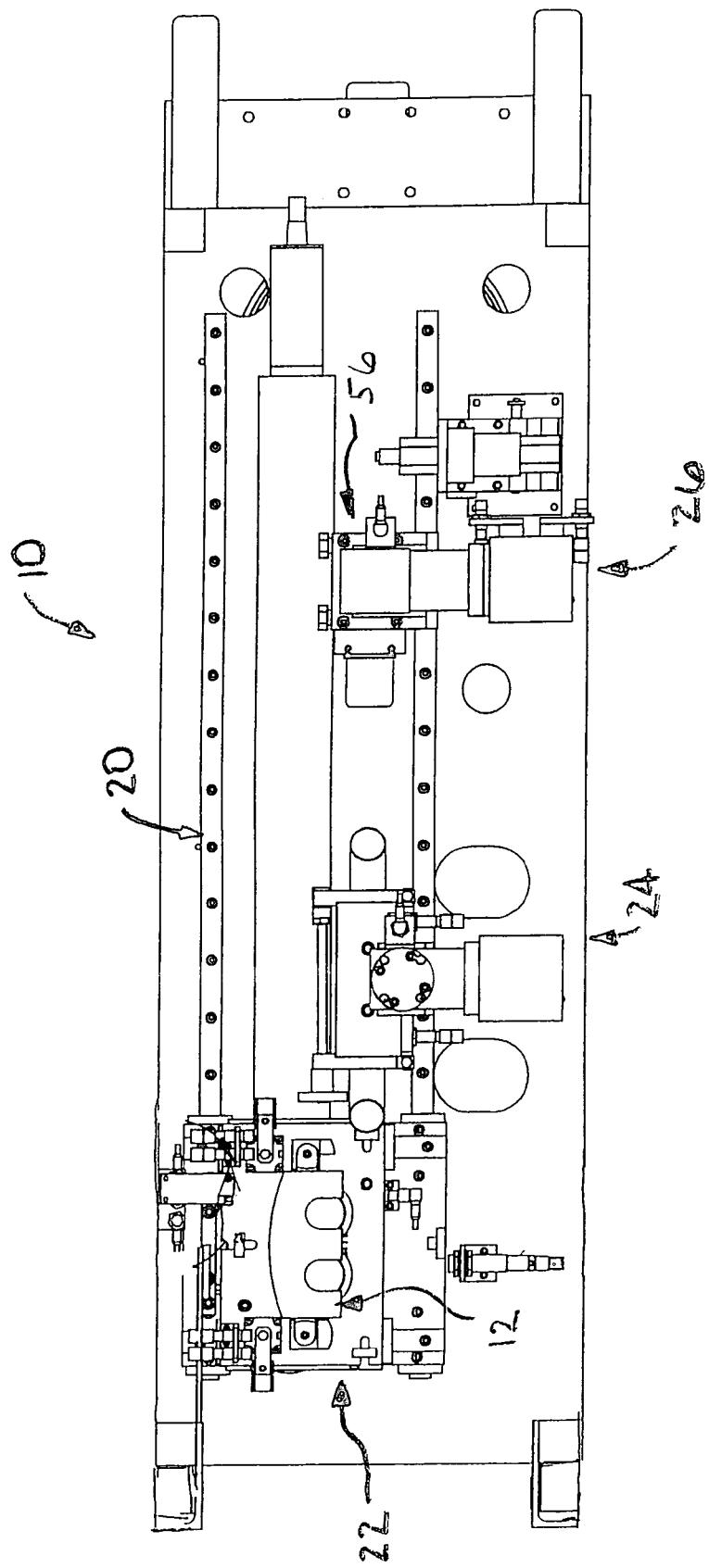
FIG. 2 is a plan view of the vehicle brake inspection apparatus of FIG. 1.
Figure 8:
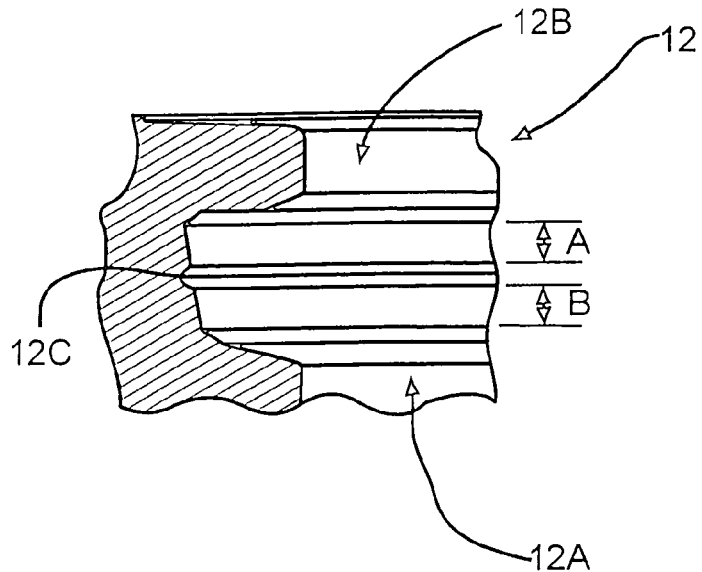
FIG. 8 is a cross-sectional view of a portion of the vehicle brake component illustrated in FIG. 1, showing an inspection area of the vehicle brake component.

Referring now to the drawings, there is illustrated in FIGS. 1 and 2 an embodiment of a vehicle brake inspection vision system or apparatus, indicated generally at 10, for inspecting a part, illustrated in this embodiment as being a vehicle brake component, indicated generally at 12. In the illustrated embodiment, the vehicle brake component 12 is illustrated as being a vehicle brake caliper having a known seal groove, indicated generally at 12A as best shown in FIG. 8, provided therein. As will be discussed below, in the illustrated embodiment the apparatus 10 is preferably operative to inspect the seal groove 12A of the brake caliper 12. However, it is to be understood that although this invention will be described in connection with the particular vehicle brake component illustrated and described herein, it will be appreciated that this invention may be used in connection with the inspection of other areas or portions of brake caliper 12 and/or in connection with the inspection of other vehicle braking system components. Also, the invention may be used to inspect other vehicle non-brake related components, such as for example, components of the vehicle steering and suspension systems, occupant safety and restraint systems, body control systems and engine systems, if so desired. In addition, the invention may be used to inspect other non-vehicle related components if so desired. Also, only those portions of the apparatus 10 which are necessary for a full understanding of this invention will be explained and illustrated in detail.

Figure 3:
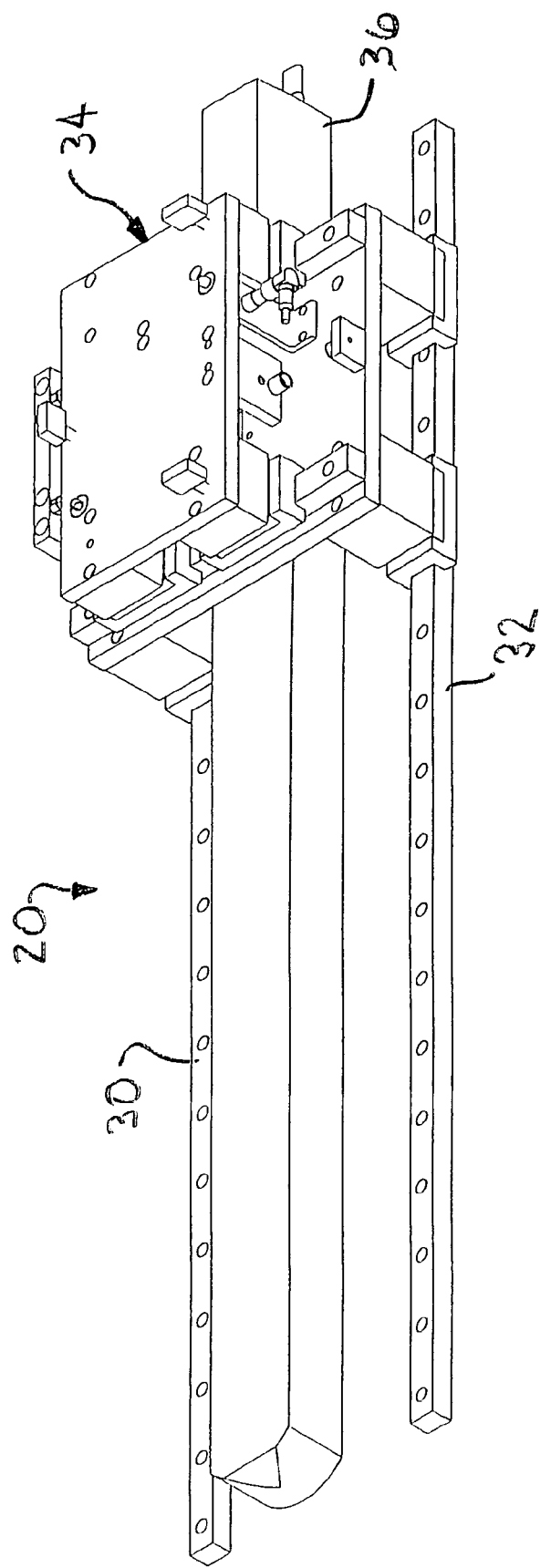
FIG. 3 is a perspective view of a brake slide fixture of the vehicle brake apparatus of FIGS. 1 and 2.

As shown therein, in the illustrated embodiment, the apparatus 10 is shown as a stand alone automated apparatus includes a brake slide fixture 20, a brake support fixture 99, a cleaning fixture 24 and a brake inspection fixture 26. As best shown in FIG. 3, the brake slide fixture 20 includes a pair of fixed rails 30 and 32 and a moveable base 34. The rails 30 and 32 are secured to a fixed surface 10A of the apparatus 10 by suitable means, such as for example, by threaded fasteners (not shown). The base 34 is slidably supported on the rails 30 and 32 for movement therealong by suitable means. In the illustrated embodiment, the base 34 is operatively pneumatically connected to a cylinder 36 for moving the base 34 along the rails 30 and 32 to a desired position on the apparatus 10. Alternatively, the construction and/or make up of the brake slide fixture 20 may be other than illustrated if so desired.

Figure 4:
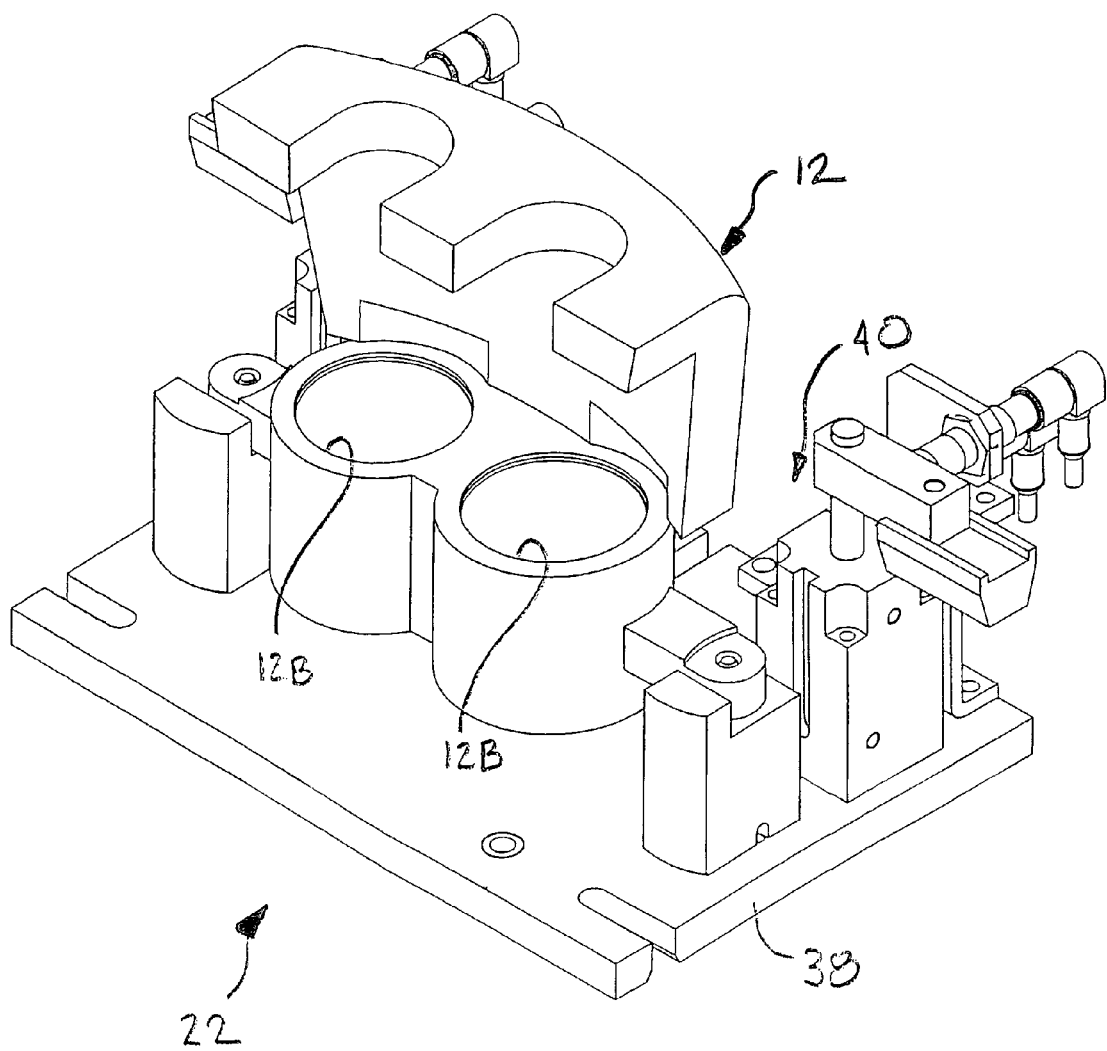
FIG. 4 is a perspective view of a brake support fixture of the vehicle brake inspection apparatus of FIGS. 1 and 2.

As best shown in FIG. 4, the brake support fixture 22 includes a base 38 and a brake component holding portion, indicated generally at 40. The base 38 is adapted to be operatively supported on and carried by the base 34 of the brake slide fixture 20 by suitable means. The holding portion 40 is adapted to operatively support or clamp the vehicle brake component 12 in a desired position. Alternatively, the construction and/or make up of the brake support fixture 22 may be other than illustrated if so desired.

Figure 5:
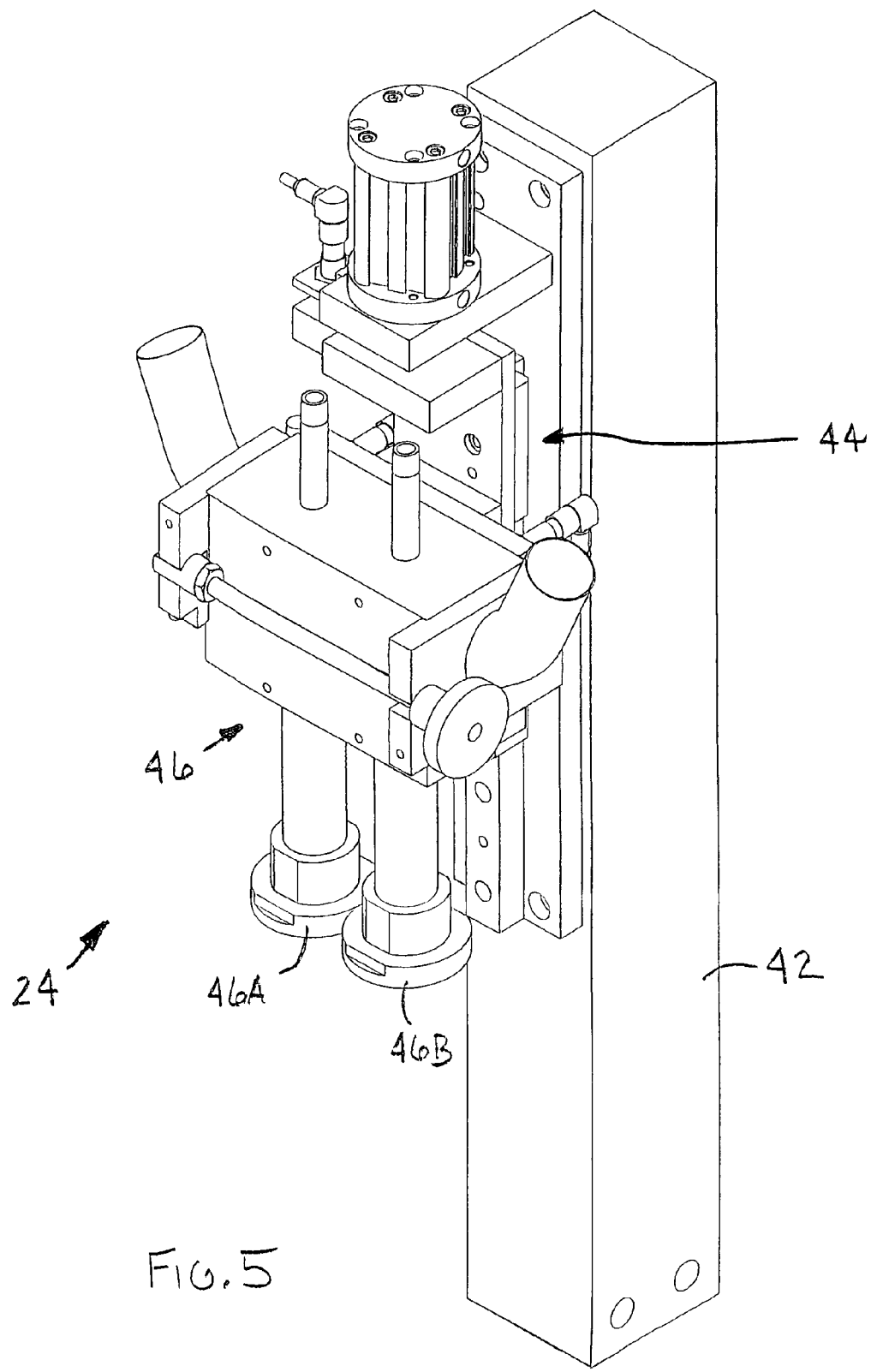
FIG. 5 is a perspective view of a vacuum fixture of the vehicle brake inspection apparatus of FIGS. 1 and 2.

As best shown in FIG. 5, in the illustrated embodiment the cleaning fixture 24 is a vacuum fixture and includes a post 42, a slide mechanism, indicated generally at 44, and a vacuum system 46. The post 42 is adapted to be operatively secured to the fixed surface 10A of the apparatus 10 by suitable means. The slide mechanism 44 is fixed to the post 42 and carries the vacuum system 46 for sliding movement relative to the post 42. In the illustrated embodiment, the slide mechanism 44 is preferably pneumatically operated. Also, in the illustrated embodiment, the vacuum system 46 includes a pair of vacuum tubes 46A and 46B which as will be discussed below, are adapted to be operatively disposed within bores provided in the associated brake component to vacuum out and remove any foreign particles, such as machining chips. Alternatively, the construction and/or make up of the cleaning fixture 24 may be other than illustrated if so desired.

Figure 6:
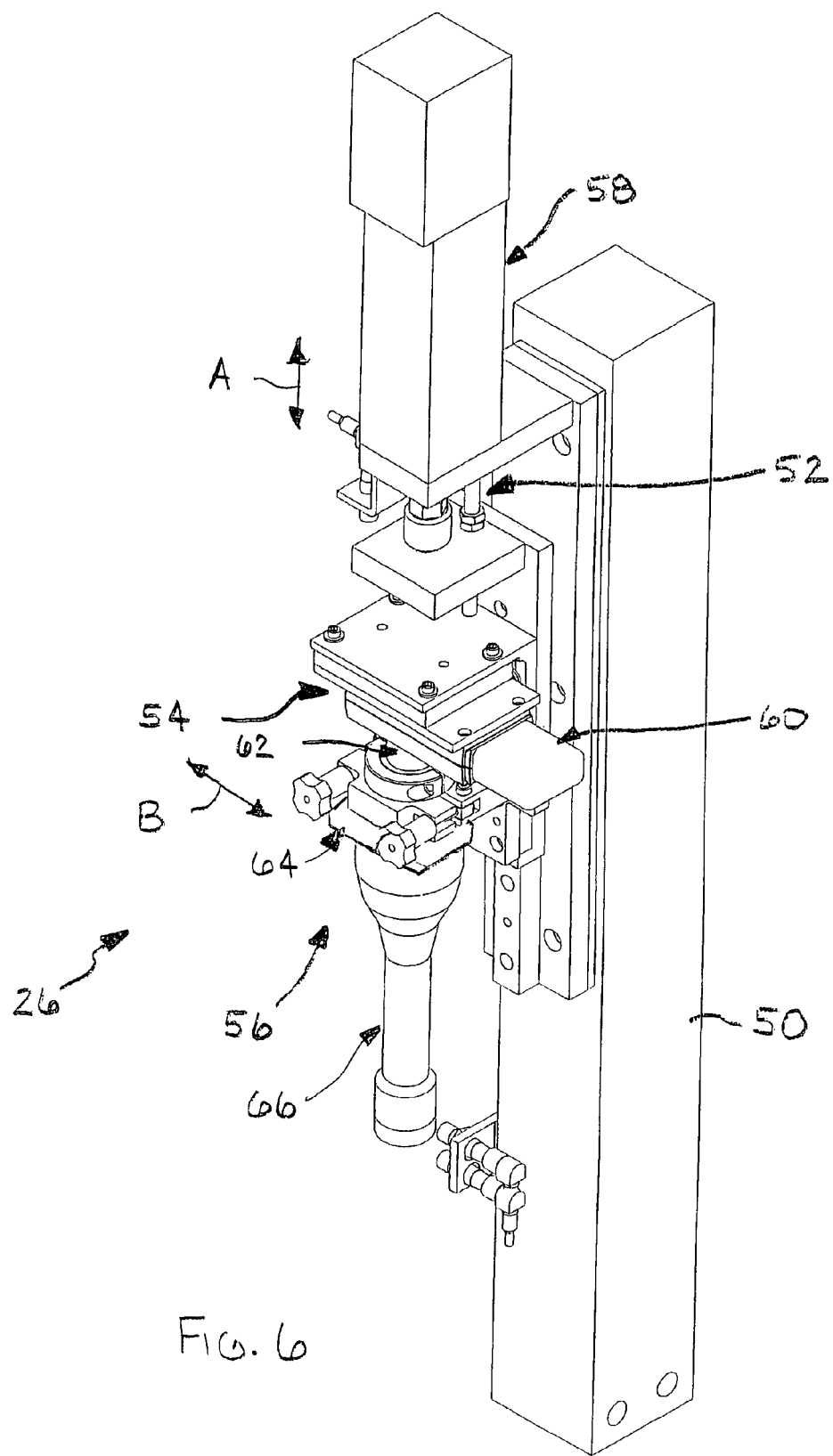
FIG. 6 is a perspective view of a brake inspection fixture of the vehicle brake inspection apparatus of FIGS. 1 and 2.
Figure 7:
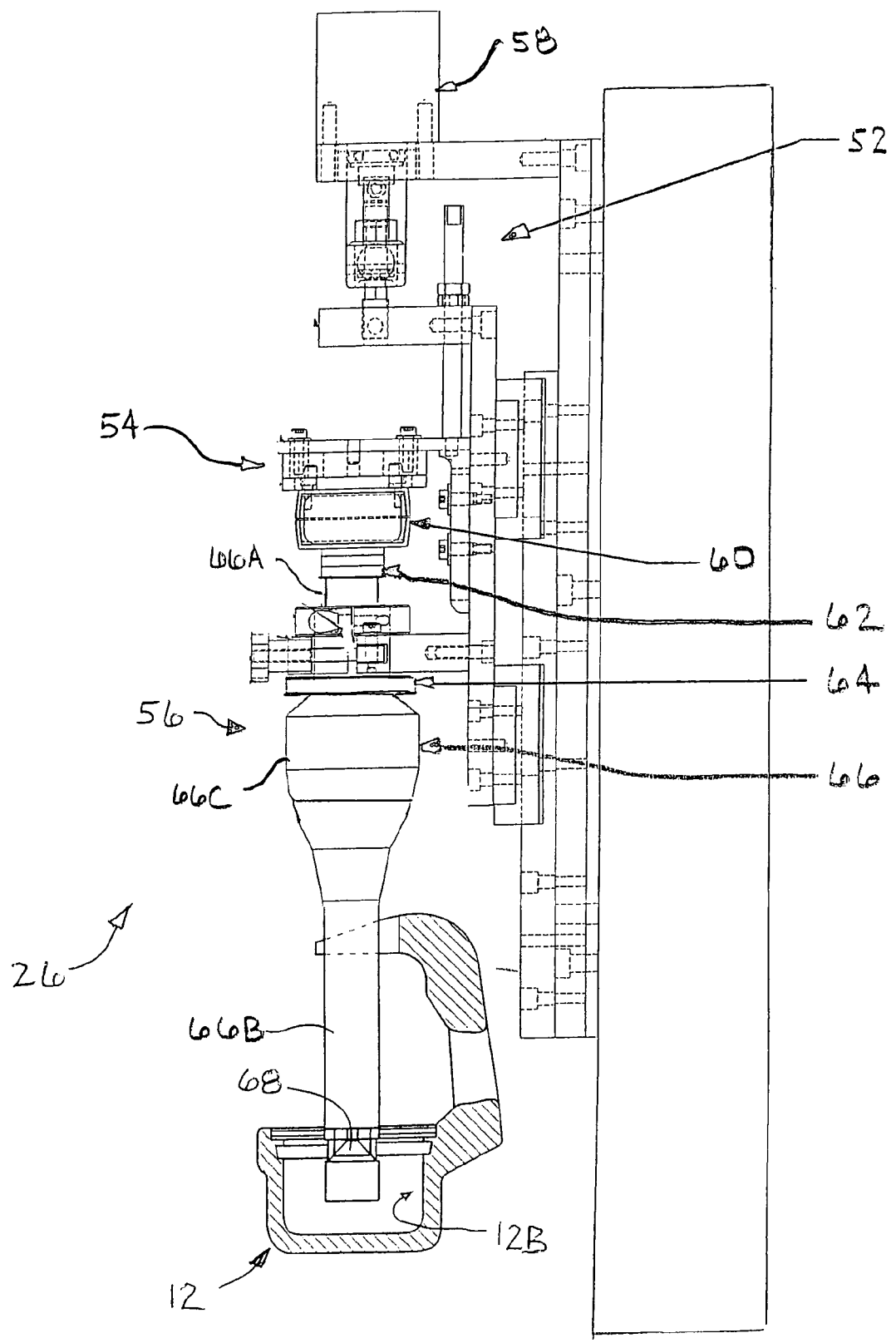
FIG. 7 is a side view of the brake inspection fixture of FIG. 6, and showing only the vehicle brake component which is to be inspected.

As shown in FIGS. 6 and 7, in the illustrated embodiment, the inspection fixture 26 includes a post 50, a first support and adjustment mechanism, indicated generally at 52, a second support and adjustment mechanism, indicated generally at 54, and preferably an inspection system 56. The post 50 is adapted to be operatively secured to the fixed surface 36 of the apparatus 10 by suitable means. The first support and adjustment mechanism 52 is operative to provide for support and the vertical adjustment of the vision system 56, as indicated generally by double arrow A in FIG. 6, and the second support and adjustment mechanism 54 is operative to provide for the support and the horizontal adjustment of the vision system 56, as indicated generally by double arrow B in FIG. 6. In the illustrated embodiment, the first adjustment mechanism 52 is preferably pneumatically actuated and adjusted via a pneumatic cylinder 58, and the second adjustment mechanism 54 is manually adjusted.

In the illustrated embodiment, the inspection system 56 is preferably an electronic vision system 54 includes a camera 60, a lens 62, a light source 64 and a borescope 66. In the embodiment illustrated, the inspection system 56 is oriented in a generally vertically stacked arrangement with the camera 60 and lens 62 supported by second support and adjustment mechanism 54 in generally the middle portion of the post 50, the borescope 66 supported by a support mechanism, indicated generally at 68, below the camera 60, and the light source 64 supported by suitable means on or about the borescope 66. Alternatively, the particular orientation, support, adjustment and/or arrangement of one or more of the camera 60, lens 62, light source 64, the borescope 66 and the vehicle brake component 12 (only shown in FIG. 7), may be other than illustrated if so desired.

In the illustrated embodiment, the camera 60 may preferably be a charge-coupled device (CCD) based image sensor (mounting, processor, memoir and sensor all in one package, manufactured by Cognex Corporation). Suitable cameras may include the Legend 530M and the Legend 540M. Alternatively, the type, construction and/or the makeup of the camera 60 may be other than illustrated and described if so desired.

In the illustrated embodiment, the lens 62 may preferably be a C-mount, fixed focal length industrial lens with lockable F-stop. A suitable lens may be an 8 mm model 23FM08-L, a 16 mm model 23FM16-L, and a 25 mm model 23FM25-L, manufactured by Tamron. Alternatively, the type, construction and/or the makeup of the lens 62 may, be other than illustrated and described if so desired.

In the illustrated embodiment, the light source 64 may preferably be a light emitting diode (LED) ring light loosely mounted or carried on a shank portion of the borescope 66. In particular, the light source 64 may include forty-eight LED's mounted in two concentric rings. Preferably, the LED's are 24VDC, continuous-duty, non-diffused, white LED's. Suitable LED's are part number 010-6048 4 0 manufactured by North East Robotics. Alternatively, the type, construction and/or the makeup of the light source 64 may be other than illustrated and described if so desired. For example, the light source could be a non-LED source, such as a high frequency fluorescent; however, LED's are preferred because of the quality of the image they allow to be captured by the camera.

In the illustrated embodiment, the borescope 66 may preferably be a suitable designed rigid optical tool and includes a shank portion 66A at a first end thereof, a sightpipe 66B at an opposite second end thereof, and an intermediate body portion 66C. Preferably, the construction of the sightpipe 66B of the borescope 66 is designed for each specific application, i.e., the construction is designed in accordance for each specific part to be inspected.

In the illustrated embodiment, the entire borescope 66 is preferably formed as a one piece unit from a high polished acrylic material. In the illustrated embodiment, the sightpipe 66B includes a mirror 68 (or other suitable image reflecting device), disposed therein near a remote end thereof. In the illustrated embodiment, the mirror 68 is preferably a conical shaped mirror and is formed as part of the borescope itself from the high polished acrylic material. Alternatively, the type, construction and/or the makeup of the borescope 66 and/or the mirror 68 may be other than illustrated and described if so desired. For example, the borescope 66 and/or the mirror 68 may be formed from other suitable material or materials and/or may be formed from two or more separate components which are assembled to form the part. Also, the borescope 66 may be formed separate from the mirror 68 from a first suitable material and the mirror may be formed form a second suitable reflective material.

The apparatus 10 of the present invention may be used to inspect parts to defect the presence of a part defect. For example, in the case of the brake caliper 12, the castings for the brake calipers are machined, inspected, washed, re-inspected, and then assembled. The machining process includes using formed inserts to create the seal groove 12A (as best shown in FIG. 8), on the inside diameter (ID) of a caliper bore 12B. The assembly process of the caliper adds components to the caliper 12, typically including a piston (not shown), a seal (not shown), and a pair of brake pads (not shown). The seal is inserted in the seal groove 12A of the caliper bore 12B to prevent break fluid from leaking past the piston. A problem that may occur during this process is the failure of the wash and inspection process to remove all of the metal chips from the seal groove 12A. If this occurs, then the piston seal may then be placed over any such remaining chips. The integrity of the seal is tested by applying air pressure and monitoring the rate of pressure decay. It is possible for the seal to function properly under test conditions if a small chip(s) is present. The small metal chip(s) may cause the caliper to leak brake fluid in the static state once it has been assembled to the vehicle by the original equipment manufacturer (OEM).

The apparatus 10 of the present invention provides a reliable way to inspect for this condition and reduces or eliminates this issue. In particular, one embodiment of the invention uses the camera 60 and associated software with the lens 62, the light source 64 and the borescope 66 to inspect the associated part. Also, it is believed that the purposeful over exposure of the part image may be preferable to enhance the cameras ability to detect a chip or foreign object therein down to approximately the size of a human hair, or approximately 0.5 mm$^2$.

According to a preferred method of the invention, the caliper or part 12 to be inspected is loaded onto the brake support fixture 22 and indexed or moved to the vacuum fixture 24. The tubes 44A and 44B of the vacuum fixture 24 are operatively disposed in the bores 12B of the caliper 12 and the fixture 24 is actuated so as to vacuum or clean out the bores to remove any undesired foreign objects or chips. Following this, the caliper 12 is indexed or moved to the brake inspection fixture 26. The fixture 26 is actuated so as to move the camera 60 having the lens 62, the light source 64 and the borescope 66, into one of the bores 12B of the caliper 12. In the illustrated embodiment, the borescope 66 is a high polished acrylic material with a conical mirror 68 at the remote end thereof. Light from the light source 64 is directed through the borescope 66 and into the bore 12B of the caliper 12 to be inspected. An image is then reflected off of the conical mirror 68 and recorded within the camera 60 and its associated operating software. The image is next analyzed via the software (such as Frameworks 2.7.4), to determine if any chips or other foreign objects are located within the bore 12B of the caliper 12, and in particular, in this embodiment, within the seal groove 12A of the caliper 12. Following this, in the illustrated embodiment of a double piston bore caliper, the borescope 66 is removed from the one bore 12A and inserted into the other bore 12A to inspect such bore in a similar manner to the first bore.

Figure 10:
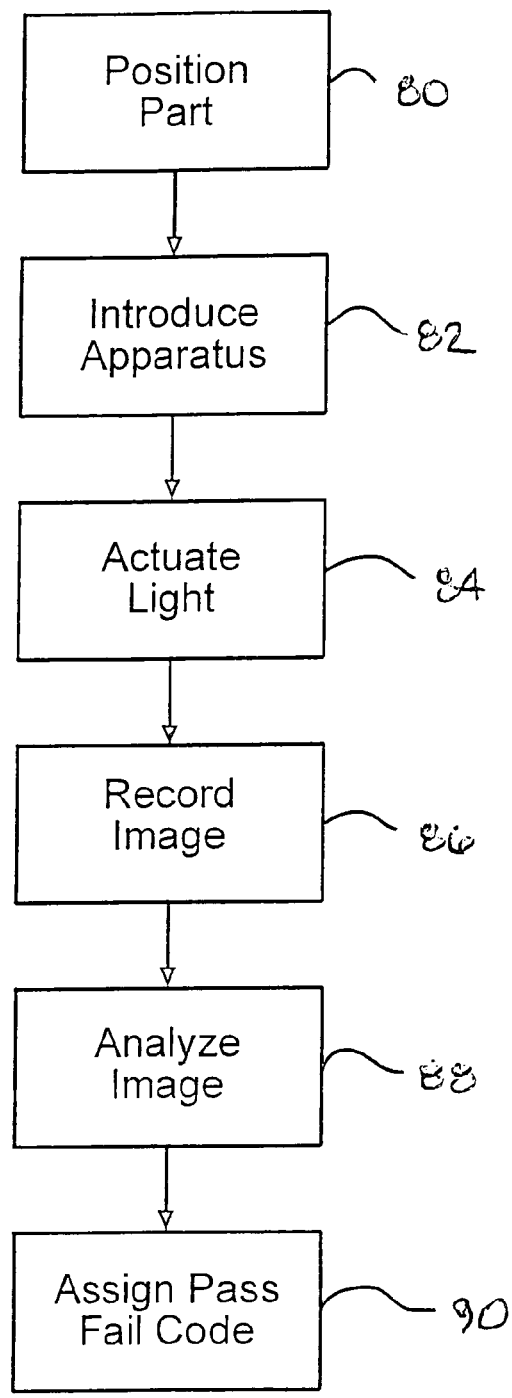
FIG. 10 is a flow diagram of an embodiment of a sequence of steps for performing the method of inspection of a vehicle brake component.

A method for inspection of a part, such as the brake caliper 12, may include the following steps shown in FIG. 10. In step 80, the caliper or other part 12 is provided to an apparatus, such as the inspection system 56. In this example, the caliper 12 may be first clamped in a desired position using selected machined surfaces for location relative to the inspection system 56. Next, in step 82, the borescope 66, is introduced into the caliper 12 such that the vision system (i.e., the camera 60, lens 62, light source 66 and borescope 68), can capture a usable image of the seal groove 12A of the caliper 12. Preferably, in step 82, the inspection system 56 is operative to orient or locate the borescope 66 in a predetermined position relative to the part to be inspected.

Next, in step 84, the light source 66 is actuated and in step 86, the image is captured or recorded by the camera 60. Following this, in step 88, the image is preferably analyzed (preferably using appropriate algorithms or other suitable means), to thereby inspect the seal groove 12A for the presence of foreign or unwanted particles (i.e., machining chips). Then, in step 90, a suitable device, such as a preprogrammed electronic controller device, may assign a pass or fail code for that part (i.e., accept or reject the part), based on predetermined criteria or other factors. Preferably, the method is done automatically and electronically; however, one or more steps of the method may be preformed manually if so desired. For example, the light source 64 could be manually actuated; the camera 60 could be manually actuated to record the image; and/or the image could be manually analyzed if so desired. Also, for inspections of calipers 12 containing twin bores using a single inspection system 56 (i.e., having only one borescope 66), the above sequence of steps may be repeated to inspect both bores of the caliper 12 before assigning a pass or fail code for that part.

Advantages are that the apparatus 10 of the present invention is that it may be possible to detect a chip or other foreign object, of approximately 0.5 mm$^2$, located on a desired area of the seal groove 12A. As shown in FIG. 8, in the illustrated embodiment, the apparatus 10 is preferably capable of detecting chips or foreign objects at least in the areas A and B of the seal groove 12A. In the illustrated embodiment, the apparatus 10 is preferably not required to detect chips located on "dark" surfaces of the part. The term dark surfaces meaning surfaces where the angle on the part creates a shadow which in turn does not allow an object of an image to be captured by the camera, such as for example, in the "chip breaker" groove 12C of the bore 12B as shown in FIG. 8.

Figure 9:
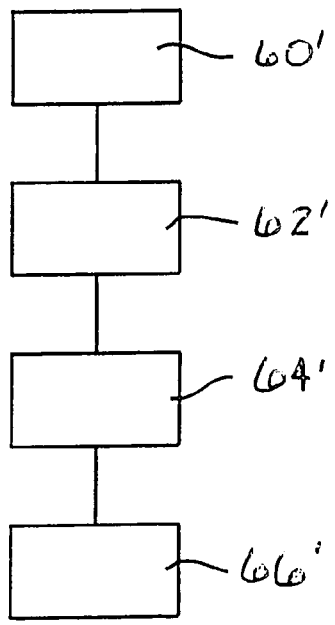
FIG. 9 is a schematic diagram of an alternate embodiment of an apparatus for inspecting a vehicle brake component.

Alternatively, the apparatus 10 may be designed to be capable of detecting chips or foreign objects on other selected parts or areas of the caliper 12, including such dark surfaces, if so desired. For example, such a suitable apparatus is schematically shown in the embodiment illustrated in FIG. 9, and uses like reference numbers with a "'" added to them to indicate corresponding parts to the inspection system 56 illustrated in FIGS. 6 and 7. As shown therein, in this embodiment, the inspection system 56' includes a camera 60', a lens 62', a light source 64' and a multi-compound angled borescope 66'. In addition, the inspection system 56 (or 56') may include more than one camera 60, lens 62, light source 64, borescope 66 and/or mirror 68 so as to enable complex geometrically shaped portions and/or more than one area of the part to be inspected by the associated apparatus.

As discussed above, although this invention has been described and illustrated as being preferably used to inspect the seal groove 12A of a brake caliper 12, the present invention may be used to inspect any other desired portions or areas of the brake caliper 12 and/or in connection with the inspection of other vehicle braking system components. Also, the invention may be used to inspect other vehicle non-brake related components, such as for example, components of the vehicle steering and suspension systems, occupant safety and restraint systems, body control systems and engine systems, if so desired. In addition, the invention may be used to inspect other non-vehicle related components if so desired. Also, the construction and/or make up of the apparatus 10 may be other than illustrated if so desired. For example, the apparatus 10 could be other than an automated stand alone apparatus and/or the apparatus may include only the inspection system portion 56 thereof if so desired.

In accordance with the provisions of the patent statues, the principle and mode of operation of this invention have been described and illustrated in its various embodiments. However, it must be understood that the invention may be practiced otherwise than as specifically explained and illustrated without departing from the scope or spirit of the attached claims.

What is claimed is:

1. An apparatus comprising:

a stand alone automated brake caliper inspecting apparatus for inspecting a brake caliper following the machining and cleaning of the brake caliper to remove machining chips or foreign objects and prior to the mounting the brake caliper on a vehicle in order to detect the presence of a machining chip or foreign object in an annular seal groove provided in a bore of the brake caliper and thereby detect a part defect in the brake caliper, said apparatus including a camera having a lens;

a borescope having a first end and a second end, said first end operatively disposed adjacent said camera and said second end having a mirror disposed therein and adapted to be introduced into the bore of the brake caliper in the area of the seal groove thereof; and a light source for supplying light to said borescope whereby said mirror is operative to reflect an image of the seal groove in the bore of the brake caliper to be inspected to said camera; and a preprogrammed electronic controller device which analyzes the image to thereby detect the presence of the machining chip or foreign object in the seal groove of the bore of the brake caliper thereby detecting a part defect in the brake caliper.

2. The apparatus of claim 1 wherein said light source is carried by said borescope.

3. The apparatus of claim 1 wherein said camera is CCD-based image sensor.

4. The apparatus of claim 1 wherein said lens is a fixed focal length lens with a lockable F-stop.

5. The apparatus of claim 1 wherein said light source is a LED ring carried by said borescope.

6. The apparatus of claim 1 wherein said borescope is formed from a high polished acrylic material.

7. The apparatus of claim 6 wherein said mirror is a conical mirror and is formed as part of said borescope.

8. The apparatus of claim 1 wherein said borescope is a multi-compound angled borescope.

9. An apparatus comprising:

a stand alone automated brake caliper inspecting apparatus configured for inspecting a brake caliper, following the machining and cleaning of the brake caliper to remove any machining chips or foreign objects and prior to the mounting the brake caliper on a vehicle in order to detect the presence of a machining chip or foreign object in an annular seal groove provided in a bore of the brake caliper and thereby detect a part defect in the brake caliper, the apparatus including a camera having a lens attached thereto;

a borescope having a first end and a second end, said first end operatively disposed adjacent said lens of said camera and said second end having a mirror disposed therein and configured to be introduced into the bore of the brake caliper in the area of the seal groove thereof to thereby detect the presence of a part defect; and a light source for supplying light to said borescope whereby said mirror is operative to reflect an image of the seal groove in the bore of the brake caliper to be inspected to said camera and thereby detect the presence of the machining chip or foreign object in the seal groove of the bore of the brake caliper thereby detecting a part defect in the brake caliper;

wherein the image captured by the camera is overexposed to enhance the ability of the camera to detect the machining chip or foreign object in the seal groove of the bore of the brake caliper and thereby detect the presence of a part defect in the brake caliper.

10. The apparatus of claim 9 wherein said light source is carried by said borescope.

11. The apparatus of claim 9 wherein said camera is CCD-based image sensor.

12. The apparatus of claim 9 wherein said lens is a fixed focal length lens with a lockable F-stop.

13. The apparatus of claim 9 wherein said light source is a LED ring carried by said borescope.

14. The apparatus of claim 9 wherein said borescope is formed from a high polished acrylic material.

15. The apparatus of claim 14 wherein said mirror is a conical mirror and is formed as part of said borescope.

16. The apparatus of claim 9 wherein said borescope is a multi-compound angled borescope.

17. A method for inspection of a brake caliper, following the machining and cleaning of the brake caliper to remove any machining chips or foreign objects and prior to the mounting the brake caliper on a vehicle in order to detect the presence of a machining chip or foreign object in an annular seal groove provided in a bore of the brake caliper and thereby detect a part defect in the brake caliper, the method comprising the steps of:

(a) providing a brake caliper having a machined area to be inspected;

(b) providing a stand alone automated brake caliper inspecting apparatus including a support fixture, a slide fixture, a preprogrammed electronic controller device, a vacuum fixture and a vision system, the vacuum fixture having at least one vacuum tube and the vision system including a camera having a lens, a borescope having a first end and a second end, the first end operatively disposed adjacent the camera and the second end having a mirror disposed therein, and a light source for supplying light to the borescope whereby the mirror is operative to reflect an image of the annular seal groove provided in the bore of the brake caliper to be inspected to the camera;

(c) securing the brake caliper on the support fixture;

(d) attaching the support fixture on a slide fixture;

(e) prior to performing step (f) operatively disposing the at least one vacuum tube in the bore of the brake caliper and actuating the vacuum fixture so as to vacuum out the bore to remove any machining chips or foreign objects;

(f) introducing a borescope into the bore of the brake caliper;

(g) actuating the light source;

(h) operating the camera to capture the image of the annular seal groove provided in the bore of the brake caliper; and (i) analyzing the captured image by the preprogrammed electronic controller device to detect by the presence of the chip or foreign object in the seal groove of the bore of the brake caliper and thereby detect the presence of a part defect in the vehicle component.

18. The method of claim 17 wherein in step (f) the image captured by the camera is overexposed.

19. The apparatus of claim 1 wherein the image captured by the camera is overexposed to enhance the ability of the camera to detect the machining chip or foreign object in the seal groove of the bore of the brake caliper and thereby detect the presence of a part defect in the brake caliper.

20. The apparatus of claim 9 wherein the stand alone automated brake caliper inspecting apparatus further includes a preprogrammed electronic controller device which analyzes the image and assigns a pass or fail code for the brake caliper.

* * * * *